Nov. 9, 1948.  P. F. SWINGS  2,453,164
PLURAL GRATING SPECTROGRAPH
Filed May 19, 1945 3 Sheets-Sheet 1
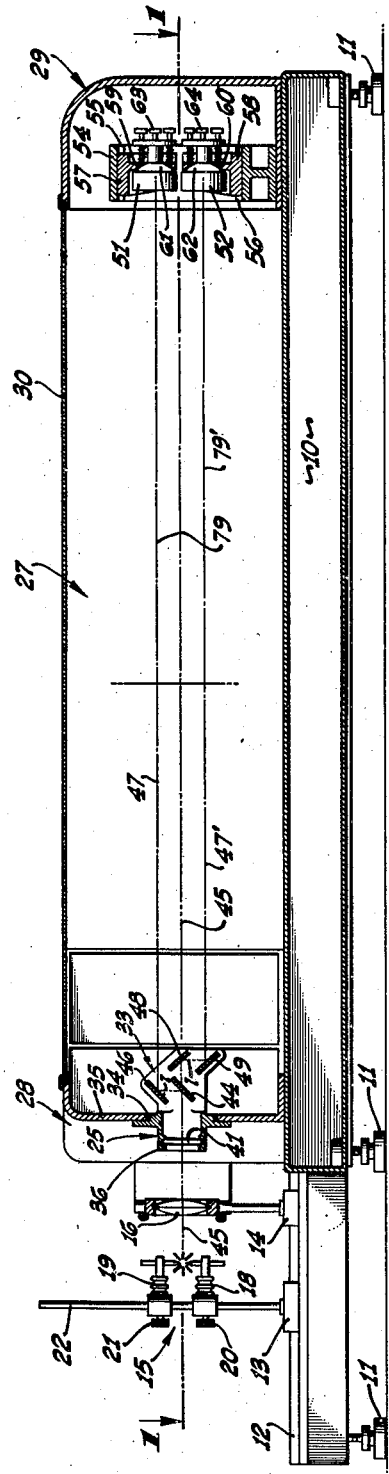
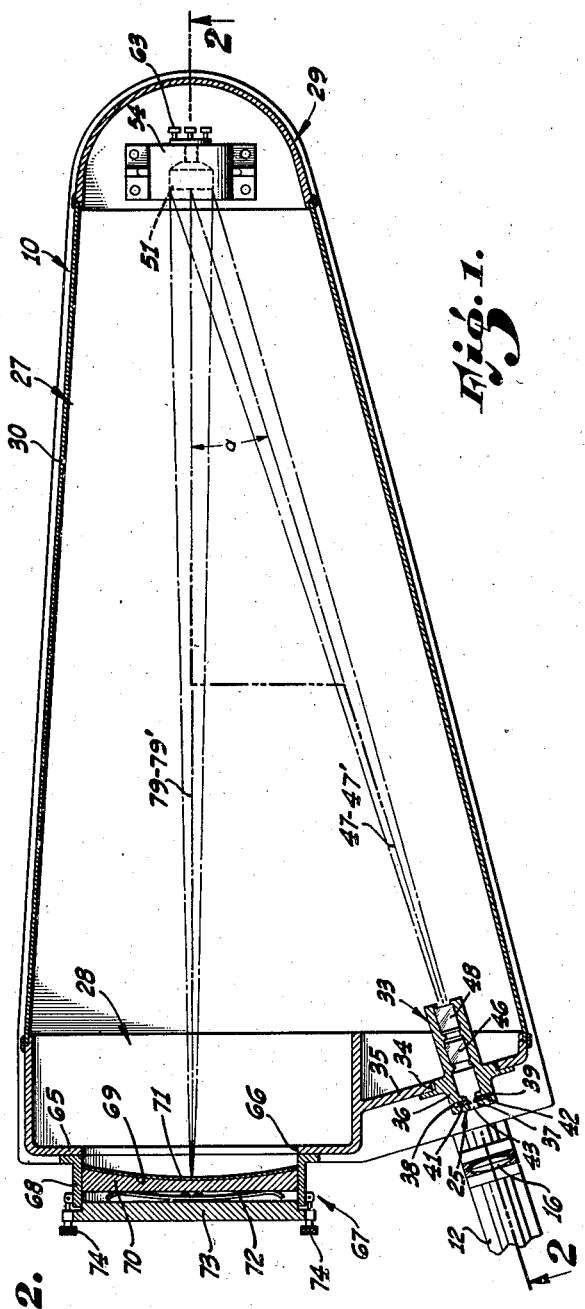
INVENTOR.
POLYDORE F. SWINGS
BY
ATTORNEY.

Nov. 9, 1948.  P. F. SWINGS  2,453,164
PLURAL GRATING SPECTROGRAPH

Filed May 19, 1945   3 Sheets-Sheet 2

INVENTOR.
POLYDORE F. SWINGS
BY
*Lyle Dillon*
ATTORNEY.

Nov. 9, 1948.  P. F. SWINGS  2,453,164
PLURAL GRATING SPECTROGRAPH

Filed May 19, 1945  3 Sheets-Sheet 3

INVENTOR.
POLYDORE F. SWINGS
BY
Lyle Dillon
ATTORNEY.

Patented Nov. 9, 1948

2,453,164

UNITED STATES PATENT OFFICE 2,453,164

PLURAL GRATING SPECTROGRAPH

Polydore F. Swings, Pasadena, Calif., assignor to Lane-Wells Company, Los Angeles, Calif., a corporation of Delaware Application May 19, 1945, Serial No. 594,656

13 Claims. (Cl. 88—14)

This invention relates to spectroscopes and the like apparatus and, particularly, to spectrographs having wide spectral ranges, together with ample dispersion and resolution over the entire range.

Industrial spectrographs of both the high dispersion and low dispersion types are deficient in a number of aspects. The conventional high dispersion types of instrument now available are able to cover only a relatively small range of wave lengths, except at the penalty of extreme bulkiness. Such conventional high dispersion instruments usually cover only the region from approximately 2,400 to 3,600 A, on one plate, and if other spectral regions are desired, adjustments and changes in the arrangement of the instrument elements must be made. For example, in a prism instrument of the conventional type, the glass prisms must be replaced by quartz prisms and the position of the lenses and the plate holder must be changed when shifting from the visual range of wave lengths to the ultra-violet. In a conventional grating instrument, either the angular position of the grating or the position of the plate holder, or that of the slit must be changed for the different spectral regions, and a number of successive exposures with accompanying readjustments have had to be made under these conditions if a wide spectral range was to be covered. The taking of such successive exposures of the spectra can be only tolerated where perfect stability and constancy with respect to time of the source of illumination and material under investigation obtains during the interval of delay. Such perfection is seldom attained and where the composition or character of the material undergoing analysis is constantly changing with time, as is often the case in certain processes, such successive exposures separated by intervals of time required for modification of the spectrograph are not permissible.

Similarly, the conventional, low dispersion types of spectroscopes or spectrographs, such as now commonly available, at best cover only a relatively small part of the spectral range useful in the usual application for which industrial instruments may be employed.

It is, accordingly, an object of this invention to overcome the hereinbefore outlined disadvantages and limitations, inherent in the present conventional, industrial spectrographs, and to present an improvement in spectrographs, in which compactness, wide spectral range, high dispersion, and ample resolution are combined in one instrument.

It is another object of this invention to provide a spectrograph of the character described, capable of photographing a spectrum of wide spectral range in a single exposure.

It is a still further object of this invention to provide a spectrograph of simplified and improved mechanical construction and operation.

The objects of this invention are accomplished, in general, by employing an arrangement of two or more dispersion means, each giving different and preferably linear dispersions of predetermined relative values, together with a single slit source of illumination and one or more plate holders as desired, said dispersion means being constructed and arranged so that two or more complementary or overlapping spectra having predetermined ranges and relative dispersion ratios may be simultaneously photographed at a single exposure if desired, on a single film or plate surface. More specifically, the objects of this invention are attained in apparatus employing the discovery that if two concave diffraction gratings having the same radius of curvature but one having twice as many ruled lines as the other one per unit length, are illuminated from a single slit-source of illumination, the resulting focused spectra can be conveniently made to cover both the ultra-violet and visible regions with the dispersion in the visible region being one half of that in the ultra-violet and the focal planes of the two spectra will lie on identical curves and in a common surface such that the two spectra can be photographed on the same film or plate, if desired. A plurality of gratings having numbers of lines bearing predetermined ratios one to another may also be similarly employed to divide the spectrum into a plurality of complementary spectra as described hereinafter.

These and other objects, advantages, and features of novelty will be evident hereinafter.

In the drawings, which show, by way of illustration, preferred embodiments of the invention and in which like numerals designate the same or similar parts throughout the several views:

Figure 1 is a plan-sectional view of the spectrograph assembly, taken on line 1—1 of Figure 2.

Figure 2 is a cross-sectional elevation of the spectrograph assembly, taken on line 2—2 of Figure 1.

Figure 3:
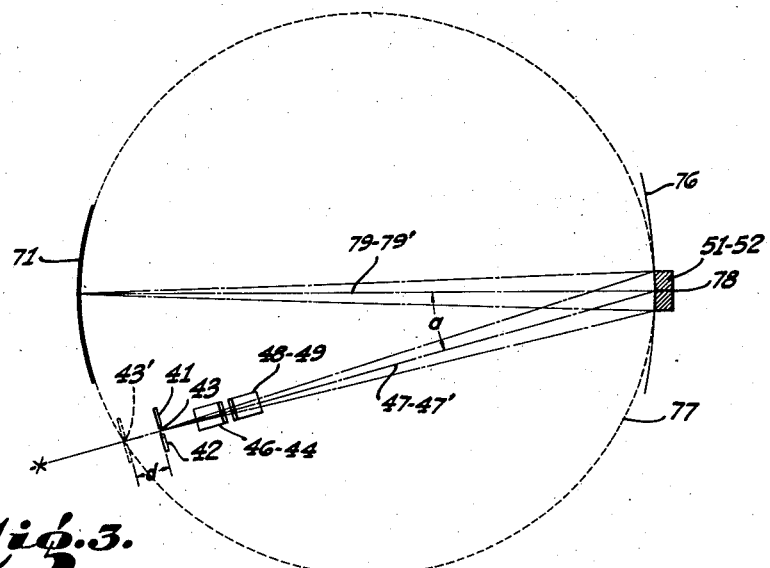
Figure 3 is a schematic diagram showing the arrangement in plan view of the elements of the spectrograph of Figure 1.

Referring now primarily to Figures 1-4, inclusive, 10 is a rigid, hollow, base member approximately triangular in general plan form and having adjustable supporting and levelling screws 11.

Extending from the forward end portion of the base member 10 is an arm, carrying ways or tracks 12. Slidably supported for longitudinal adjustment on the ways 12, are the respective bases 13 and 14 of a workholder assembly 15 and a condenser lens 16.

While the workholder is here illustrated as comprising cathode and anode elements of an electric arc or spark supported vertically in coaxial position by means of insulators 18 and 19 which are, in turn, slidably supported for relative vertical adjustment at 20 and 21 on rod 22, extending upward from the base member 13; other conventional workholding and illumination source means may be employed suited to the particular material to be analyzed. As before stated, the workholder assembly and the condenser lens support resting on their base members 13 and 14 are slidably supported on the ways 12 and are thus adjustable with respect to one another, as well as with respect to the slit holder 25, in order to obtain the desired light intensity and, if desired, focus of the source of illumination on the slit.

The light-analyzing elements of the spectrograph are housed within a light-excluding housing 27 supported on the upper surface of the base member 10. The housing 27 comprises a forward end member 28, a rearward end member 29, and an intermediate, interconnecting hood 30.

The slit holder 25 and an integral beam splitter assembly 33 are supported, with their common axes parallel to the ways 12, in an aperture 34 formed in a wall portion 35 of the forward end member 28 of the spectrograph housing. The slit holder comprises a generally cylindrical housing 36 provided with a forward opening portion 37. The opening 37 leads to a pair of oppositely positioned, vertically disposed knife-edge elements 41 and 42, which are adjustable laterally in a pair of inner, horizontally extending recesses 38 and 39, to form a vertical, rectangular slit-source of illumination 43 of any desired width.

The beam splitter assembly portion 33 comprises a transparent, partial reflector element 44 located on the common axis 45 of the slit holder 25 and condensing lens 16, and making an angle of 45° therewith is thereby adapted to reflect a portion of the diverging, entering beam upward to the lower surface of an upper diagonal mirror 46, and thence along an upper path having a central beam axis 47 parallel with axis 45. The unreflected portion of the diverging light passing through the partial reflector 44 is reflected from the lower surface of diagonal mirror 48 to the upper surface of a lower diagonal mirror 49 and thence along a lower central beam axis 47' which is parallel with the upper beam axis 47. A pair of vertically spaced, but identical slit-sources of illumination are thus in effect formed from a single source, for the two diffraction gratings hereinafter described.

In the rear portion of the spectrograph housing and within the end member 29 are a pair of concave diffraction gratings 51 and 52, supported in vertical alignment one above the other in position to centrally intercept light flowing from the beam splitter along the beforementioned upper and lower parallel beam paths or axes 47 and 47'. The said concave gratings are adjustably supported upon a suitable structure comprising a generally rectangular frame 54 carrying upper and lower ways 55 and 56 upon which upper and lower cells 57 and 58 are slidably supported for longitudinal adjustment. Each of the cells 57 and 58 are provided with spherical seats 59 and 60 into which corresponding spherical members 61 and 62 attached to the rear surfaces of the concave gratings 51 and 52 are adapted to rest. The said spherical members 61 and 62 are urged into firm sliding contact with the spherical seats 59 and 60 by means of a plurality of adjusting screws, as shown at 63 and 64, whereby the positions of said concave gratings may be universally adjusted within the required angular limits.

The concave diffraction gratings 51 and 52 may be of any desired design such as that conventionally employed, which, for example, usually comprises a glass blank, the concave figured surface of which has been coated with a thin layer of aluminum or the like suitable metal applied by suitable means such as by evaporation and on which the desired number of uniformly spaced parallel lines has been ruled by means of a diamond.

In the wall 65 of the forward end portion 28 of the spectograph housing at a position opposite the gratings and adjacent the slit assembly, is an elongated, rectangular-shaped window 66, over which a film-supporting camera assembly is suitably attached, as best shown at 67 in Figure 1. The film-holder assembly comprises a rectangular frame 68 having formed on the inside a pair of arcuate shoulders 69, lying in the surface of an imaginary cylinder 77, hereinafter described in connection with Figure 4, and a pressure plate 70 of corresponding, curved shape is adapted to hold a strip of film between the said pressure-plate 70 and the said shoulders 69, as shown at 71. The pressure plate 70 is adapted to be forced into clamping engagement with the film 71 by means of suitable leaf springs 72 carried on the inner side of a film-holder back 73 which is, in turn, removably attached to the film-holder assembly by means of suitable thumb screws 74.

Although several types of mounting arrangements of the elements of the spectrograph may be employed, the type of arrangement herein illustrated in Figures 1 to 4, inclusive, is an adaptation of that which, in general, follows the scheme originated by Rowland for concave gratings. As originally conceived by Rowland, the elements of this spectrograph were arranged so that the slit and the diffracted spectrum both lie on a circle to which the concave diffraction grating is tangent and which has as its diameter the radius of curvature of the grating blank. This circle is known as the Rowland circle. In the adaptation or modification of the Rowland mounting arrangement, which constitutes a feature of this invention, the single slit, the plurality of concave gratings and the common surface upon which the spectra are projected, which surface in the present case, is the beforementioned film sheet illustrated at 71, are all effectively positioned to lie in an imaginary cylindrical surface, coaxial with and having a diameter equal to the Rowland circle, as diagrammatically illustrated in dotted lines at 77 in Figures 3 and 4. For convenience, the beforementioned cylindrical surface 77 will sometimes be referred to herein as the Rowland cylinder. Ordinarily, in the conventional arrangement and in the absence of a beam splitter, such as that illustrated at 33, the slit 43 would be located, as shown in dotted lines at 43' in Figure 3, on the Rowland circle 77 or lying within the Rowland cylinder shown in Figure 4. However, when employing a beam splitter as shown at 33, in order to provide parallel paths of illumination to the separate diffraction gratings, it is necessary to move the slit 43 inward from the Rowland cylinder a distance $d$, equal to the lateral deviation 1 of the beams in the beam splitter, between the diagonal mirrors 44 and 46, for example, in order to preserve the virtual position of the slit within the so-called Rowland cylinder 77 and thus at a total effective distance from the slit to the gratings, equal to that which it would have in the absence of the beam splitter, and when positioned at 43' on the said Rowland cylinder.

In the Rowland type of mounting, as before stated, the concave diffraction grating has a concave spherical surface, the extended curvature of which is indicated at 76, having a radius of curvature equal to the diameter of the Rowland circle 77, and positioned tangent at 78 to the Rowland circle 77 in the manner best shown in Figure 3. The surface upon which the spectrum is projected, for example the curved photographic film, as illustrated at 71 in Figure 3, may be cylindrical in form, and is coaxial with and has a radius of curvature equal to the radius of the said Rowland circle. Thus, with two or more concave gratings arranged as shown at 51 and 52, the slit 43, and the film-holder 67, including the film strip 71, are positioned with respect to one another in the construction illustrated in Figure 1, substantially in accordance with the schematic diagrams of Figures 3 and 4. With this arrangement, as will be evident, the film-holder and the gratings will be substantially diametrally opposite one another with the light beam axis lines 79 and 79' practically normal to the surfaces of the gratings 51 and 52 at their centers, for normal spectra. The beam axes 47 and 47' extending from the beam splitter 33 will also intersect the lines 79 and 79' at the centers of the concave grating surfaces at their points of tangency 78 with the Rowland cylinder 77, each making a horizontal angle ($a$) with the respective axes 79 and 79', which angle may have a suitable value dependent upon the dimensions of the instrument, the number of lines in the gratings, the angle of optimum reflectivity of the gratings, and the order of spectra to be observed, as hereinafter more fully described.

Referring now again to Figures 1 to 4, inclusive, and particularly, to Figure 4, it has been found that if the number of lines per inch of one of the gratings is twice that of the other grating, two spectra of the same source of illumination in different spectral regions may be simultaneously formed on the same film strip 71, as illustrated at 80 and 80'. For example, a spectrograph of the type hereinbefore described was constructed with a grating corresponding to that shown at 51 having 12,000 lines per inch and with that corresponding to grating 52 having 24,000 lines per inch, both of the gratings having radius of curvatures of 150 centimeters. The angle ($a$) was approximately 16° 26'. With this arrangement, the spectrum produced at 80 from the grating 51 covered the spectral region of from 4,000 to 8,000 A with a dispersion of approximately 14 A per millimeter, while the adjacent spectrum simultaneously produced at 80' from the grating 52 on the same surface, covered the spectral region of from 2,000 to 4,000 A with a dispersion of approximately 7 A per millimeter. The length of the common film sheet 71 containing the spectra 80 and 80' was approximately 12 inches. Thus, it is seen that by employing twin gratings, such as that illustrated at 51 and 52, in which the number of lines per unit length of one grating is double that of the other, adjacent spectra may be simultaneously obtained and recorded on a common cylindrical film surface, or, if desired, upon separate film surfaces lying adjacent to one another on a common cylindrical surface, the ranges of which are complementary and have dispersions which bear direct ratios one to the other.

While, in the apparatus hereinbefore shown and described, two gratings are shown, any desired number of gratings may be similarly employed to cover various complementary or extended portions of the spectrum with any degree of dispersion as desired.

Figure 4:
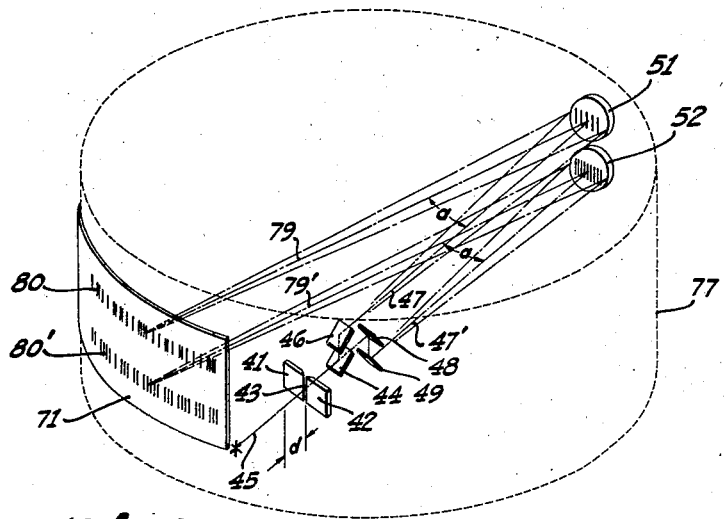
Figure 4 is a perspective view of the elements of Figure 3.

When a plurality of gratings are thus employed, the number of lines per unit length of grating for each grating may bear any suitable ratio one to another depending upon the relative degree of dispersion required. For example, when, instead of two complementary spectra as illustrated herein, three complementary spectra are required, the number of lines per unit length of gratings may bear the relationship of 1:2:4, respectively, with the result that three parallel spectra can be formed on a common so-called focal plane surface in a manner similar to that illustrated for two spectra, as illustrated in Figure 4, but with dispersion relationships bearing corresponding ratios.

For example, three vertically spaced concave diffraction gratings may be employed having 7,000, 14,000, and 28,000 lines per inch, respectively, with the resultant complementary portions of the spectra covering the spectral regions of 7,000 to 14,000; 3,500 to 7,000 and 1,750 to 3,500 and bearing the corresponding relative dispersions of approximately 24 A, 12 A and 6 A, respectively.

When a series of gratings are employed as just mentioned, each succeeding grating in the series may have its number of lines either twice or one-half of that of the preceding one and thus the spacings S, of the lines for different diffraction gratings would bear the following relation to the number of individual gratings:

$$S = 2^{(n-1)} \cdot d$$

where $n$, equals any number from 1 to the total number of gratings employed, and $d$, equals a given spacing between lines of one of the gratings.

While, for purposes of illustration, this invention has been described in connection with, or as a modification of, the Rowland type of mounting, the invention is also similarly adaptable to several other well-known types of mountings. For example, in Figures 5 and 6, another suitable alternative type of mounting arrangement is shown, to which this invention is readily applicable. In this arrangement, which is an adaptation of the simple Wadsworth type of mounting, the diffraction gratings are designed to operate from parallel light instead of diverging light as with the Rowland type and for this purpose, the slit 43 is located at the equivalent concurrent focal points of a pair of concave collimating mirrors 80 and 81. The resulting parallel rays 75 and 75', reflected from the collimating mirrors 80 and 81, are projected onto the concave figured surfaces of a pair of concave gratings 83 and 84, respectively, and the resulting spectra projected, as shown at 86 and 87, upon a pair of curved film strips or a single curved film 85, said curved film strip or strips being located coextensive with the so-called curved focal planes of the gratings.

Figure 5:
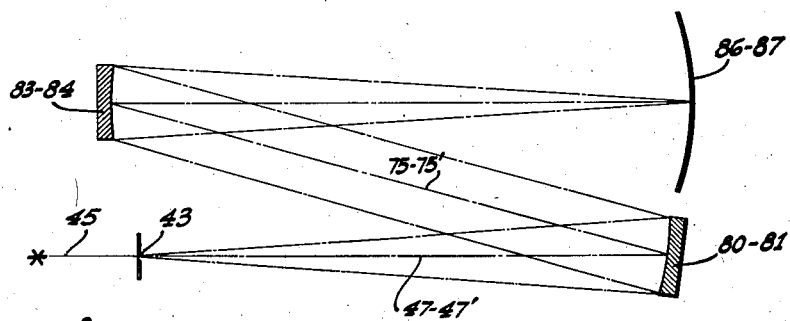
Figure 5 is a schematic diagram in plan view of an alternative arrangement of the elements of the spectrograph.
Figure 6:
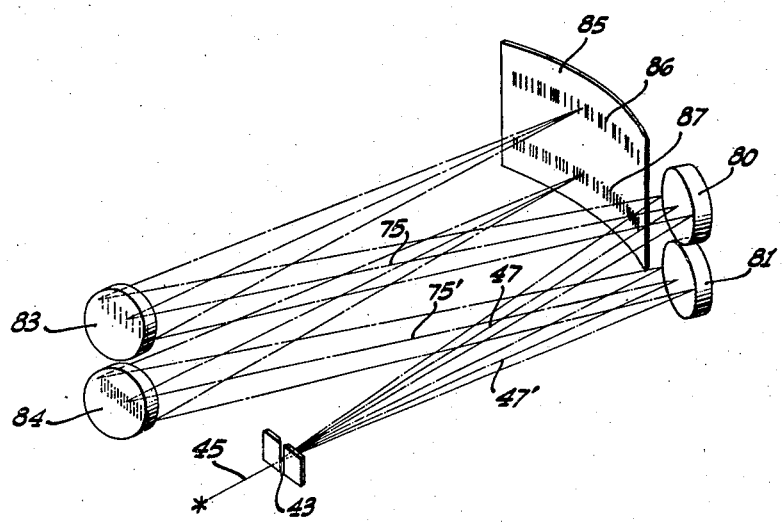
Figure 6 is a perspective view of the elements of Figure 5.

In Figures 5 and 6, as before stated, an adaptation of the simple Wadsworth mounting has been effected in accordance with this invention. However, if desired, the mounting can be further modified to position the spectra and the film-holder, if any, adjacent the slit for more convenient operation by a single operator, by employing an additional plane mirror to intercept the parallel rays at some point on the axis 75—75' intermediate the mirrors 80, 81, and gratings 83, 84. An additional light passage across the spectrograph is thus provided which permits the surface 85 to be positioned on the side of the spectrograph occupied by the slit 43. An example of a suitable construction of this Wadsworth type of twin mountings comprises concave gratings 83 and 84, having 12,000 lines and 24,000 lines per inch, respectively, on a radius of curvature of 300 centimeters. The resulting spectra 86 and 87 will cover stigmatically, the spectral regions of from 4,000 to 8,000 A and from 2,000 to 4,000 A, respectively, with dispersions of approximately 13.6 and 6.8 A per millimeter.

In the Rowland adaptation, hereinbefore described, it will be noted that, that portion of the spectrum extending into the ultra-violet is derived from that portion 47 of the beam from the beam splitter which is reflected from the surface of the partial reflector 44. That portion of the spectrum which is confined to the visible region is derived from the beam 47' which passes through the partial reflector 44, which may be made of glass and may thus serve as a filter to absorb the second order of the ultra-violet spectrum. In the Wadsworth adaptation, a suitable ultra-violet filter glass may be interposed at some convenient point such as in one of the beams 75 or 75' to exclude the ultra-violet from the visible spectrum.

The twin or plural mounting of gratings, in accordance with this invention as herebefore described, is not only applicable to those employing concave gratings, but is also similarly applicable to the various well-known mounting arrangements employing plane gratings.

It is to be understood that the foregoing is illustrative only and that the invention is not limited thereby, but may include various modifications and changes made by those skilled in the art without departing from the spirit and scope of the invention as defined in the appended claims.

I claim:

1. A device of the character described, comprising: a source of a beam of radiant energy having divergent rays; means to receive and to transform said beam into a plurality of like parallel beams; a plurality of concave diffraction gratings, all having the same focal length and positioned with a common focal plane, and adapted to receive said parallel beams of radiant energy; and means in said focal plane to receive simultaneously spectra from said gratings.

2. A device of the character described, comprising: a slit-source of a beam of radiant energy having divergent rays; means to receive and to transform said beam into a plurality of like parallel beams; a plurality of concave diffraction gratings, all having the same focal length and positioned parallel with said slit and with a common focal plane, and adapted to receive said parallel beams of radiant energy; and means in said focal plane to receive simultaneously spectra from said gratings.

3. A device of the character described, comprising: a slit-source of a beam of radiant energy having divergent rays; means to receive and to transform said beam into a plurality of like parallel beams; a plurality of concave diffraction gratings, all having predetermined different line spacings, but the same focal lengths and positioned parallel with said slit and with a common focal plane, and adapted to receive said parallel beams of radiant energy; and means in said focal plane to receive simultaneously spectra from said gratings.

4. A device of the character described, comprising: a slit-source of divergent radiant energy lying virtually in an imaginary cylindrical surface; a plurality of concave diffraction gratings spaced from one another longitudinally along said cylindrical surface and each having a radius of curvature equal to the diameter of said cylindrical surface and lying tangent to said cylindrical surface in positions adapted simultaneously to receive said radiant energy from said slit-source; uniformly spaced lines on said diffraction gratings with the lines of different gratings having predetermined different spacings and surface means coextensive with said cylindrical surface to receive focused, slit spectra from said gratings.

5. A device of the character described, comprising: means for forming, from a single source, a plurality of straight, longitudinally spaced, coaxially aligned, slit-sources of radiant energy lying virtually wholly in an imaginary cylindrical surface; a plurality of concave, diffraction gratings spaced from one another longitudinally along said cylindrical surface and each having a radius of curvature equal to the diameter of said cylindrical surface and lying tangent to said cylindrical surface at positions opposite said virtual slit-sources and adapted simultaneously to receive radiant energy therefrom, said diffraction gratings having different grating line spacings; and surface means coextensive with said cylindrical surface to receive focused, slit spectra from said gratings.

6. A device of the character described, comprising: means for forming, from a single source, a plurality of straight, longitudinally spaced, coaxially aligned, slit-sources of radiant energy lying virtually wholly in an imaginary cylindrical surface; a plurality of concave, diffraction gratings spaced from one another longitudinally along said cylindrical surface and each having a radius of curvature equal to the diameter of said cylindrical surface and lying tangent to the said cylindrical surface at positions opposite said virtual slit-sources and adapted simultaneously to receive radiant energy therefrom; uniformly spaced lines on each of said diffraction gratings with the spacings on different diffraction gratings bearing the relation to each other of $2^{(n-1)} \cdot d$, where $n$, equals any number from 1 to the total number of different gratings employed, and $d$, equals a given spacing between lines of one of the gratings; and surface means coextensive with said cylindrical surface to receive focused, slit spectra from said gratings.

7. A device of the character described, comprising: a slit-source of radiant energy lying virtually wholly in an imaginary cylindrical surface; a pair of concave, diffraction gratings spaced from one another longitudinally along said cylindrical surface and each having a radius of curvature equal to the diameter of said cylindrical surface and lying tangent to the said cylindrical surface at positions opposite said slit-source and adapted simultaneously to receive radiant energy therefrom; lines on said diffraction gratings, the lines on one of said gratings having a spacing twice that of the lines on the other of said gratings; and surface means coextensive with said cylindrical surface to receive focused, slit spectra from said gratings.

8. A device of the character described, comprising: a slit-source of a divergent radiant energy beam; means for receiving the divergent radiant energy beam from said slit-source and for forming a plurality of beams therefrom having parallel axes; a plurality of concave, diffraction gratings spaced from one another longitudinally along an imaginary cylindrical surface, each grating having radii of curvature equal to the diameter of said cylindrical surface and lying tangent to the said cylindrical surface at a position adapted to receive one of said parallel beams from said means said diffraction gratings having different grating line spacings, and surface means coextensive with said cylindrical surface to receive focused, split spectra from said gratings.

9. A device of the character described, comprising: a slit-source of a divergent radiant energy beam; a beam splitter for receiving the divergent radiant energy from said slit-source and for forming a plurality of beams therefrom having parallel axes; a plurality of concave, diffraction gratings spaced from one another longitudinally along an imaginary cylindrical surface, each grating having radii of curvature equal to the diameter of said cylindrical surface and lying tangent to the said cylindrical surface at a position adapted to receive one of said parallel beams from said beam splitter said diffraction gratings having different grating line spacings, and surface means coextensive with said cylindrical surface to receive focused, split spectra from said gratings.

10. A device of the character described, in accordance with claim 8, in which the lines of one of said diffraction gratings have double the spacing of the lines of another of said diffraction gratings.

11. A device of the character described, in accordance with claim 8, in which the lines of one of said diffraction gratings have double the spacing of the lines of another of the diffraction gratings, and the two diffraction gratings are positioned to project corresponding spectra onto the said cylindrical surface in adjacent, longitudinally spaced relationship, such that the wave length scale of one spectrum is double that of the other.

12. A device of the character described, in accordance with claim 9, in which the lines of one of said diffraction gratings have double the spacing of the lines of another of said diffraction gratings.

13. A device of the character described, in accordance with claim 9, in which the lines of one of said diffraction gratings have double the spacing of the lines of another of the diffraction gratings, and the two diffraction gratings are positioned to project corresponding spectra onto the said cylindrical surface in adjacent, longitudinally spaced relationship, such that the wave length scale of one spectrum is double that of the other.

POLYDORE F. SWINGS.

REFERENCES CITED

The following references are of record in the file of this patent:

UNITED STATES PATENTS

| Number | Name | Date |
|---|---|---|
| 2,221,170 | Richardson | Nov. 12, 1940 |

FOREIGN PATENTS

| Number | Country | Date |
|---|---|---|
| 685,815 | Germany | Dec. 27, 1939 |

OTHER REFERENCES

Scientific American, March 1944, pages 140 and 141. (Copy in Scientific Library, U. S. Patent Office.)

Certificate of Correction

Patent No. 2,453,164. November 9, 1948.

POLYDORE F. SWINGS

It is hereby certified that errors appear in the printed specification of the above numbered patent requiring correction as follows:

Column 7, line 43, for "geams" read *beams*; column 9, line 24, after the word "means" insert a comma; lines 27 and 44, for "split" read *slit*; line 41, after "splitter" insert a comma;

and that the said Letters Patent should be read with these corrections therein that the same may conform to the record of the case in the Patent Office.

Signed and sealed this 5th day of April, A. D. 1948.

[SEAL]

THOMAS F. MURPHY,
*Assistant Commissioner of Patents.*